(12) United States Patent
Smith

(10) Patent No.: US 10,532,414 B2
(45) Date of Patent: Jan. 14, 2020

(54) WORK TABLE FENCE ASSEMBLY AND SLED THEREFOR

(71) Applicant: JessEm Products Limited, Orillia, Ontario (CA)

(72) Inventor: Darrin E. Smith, Innisfil (CA)

(73) Assignee: JessEm Products Limited (CA)

(*) Notice: Subject to any disclaimer, the term of this patent is extended or adjusted under 35 U.S.C. 154(b) by 301 days.

(21) Appl. No.: 15/393,948

(22) Filed: Dec. 29, 2016

(65) Prior Publication Data

US 2018/0185935 A1 Jul. 5, 2018

(51) Int. Cl.
| | |
|---|---|
| B27C 5/06 | (2006.01) |
| B23D 47/02 | (2006.01) |
| B23D 45/06 | (2006.01) |
| B23D 47/04 | (2006.01) |
| B23D 59/00 | (2006.01) |

(52) U.S. Cl.
CPC ........... B23D 47/025 (2013.01); B23D 45/06 (2013.01); B23D 47/045 (2013.01); B27C 5/06 (2013.01); B23D 59/006 (2013.01)

(58) Field of Classification Search
CPC .... B27C 5/02; B27C 5/04; B27C 5/06; B27B 27/02; B27B 27/10
USPC ......... 144/242.1, 245.1, 245.6, 246.1, 246.2, 144/248.2, 248.4; 125/35
See application file for complete search history.

(56) References Cited

U.S. PATENT DOCUMENTS

| | | | | |
|---|---|---|---|---|
| 5,617,909 A | * | 4/1997 | Duginske | B27B 25/10 144/253.1 |
| 6,557,601 B1 | * | 5/2003 | Taylor | B27B 27/02 144/253.1 |
| 6,588,468 B1 | * | 7/2003 | Tucker | B23Q 3/005 144/135.2 |
| 6,688,202 B2 | * | 2/2004 | Parks | B23D 47/025 144/287 |
| 6,880,442 B2 | * | 4/2005 | Duginske | B27B 27/08 144/253.1 |
| 7,255,144 B2 | * | 8/2007 | Smith | B23Q 3/007 144/253.1 |
| 8,783,240 B2 | * | 7/2014 | Lawlor | B23D 47/045 125/13.01 |
| 9,221,188 B1 | * | 12/2015 | Wisen | B27B 27/10 |
| 9,358,700 B2 | * | 6/2016 | Smith | B27B 27/02 |
| 2009/0272463 A1 | * | 11/2009 | Smith | B23B 47/28 144/144.52 |

* cited by examiner

*Primary Examiner* — Matthew Katcoff
(74) *Attorney, Agent, or Firm* — Stinson LLP

(57) ABSTRACT

A sled assembly configured to push stock along a fence includes a carriage and rollers mounted at spaced apart positions. The rollers engage the fence to guide movement of the carriage therealong and each has a peripheral portion for being received in a fence race. An adjustable roller mount selectively adjusts the position of the roller to align the peripheral portions of the rollers with the width of the race. An adjustable fence assembly includes an outfeed fence movable relative to an infeed fence. An outfeed fence adjustment mechanism includes mounting posts at spaced apart locations along the length of the outfeed fence movable to drive movement of the outfeed fence along an axis transverse to the feed direction.

20 Claims, 14 Drawing Sheets

WORK TABLE FENCE ASSEMBLY AND SLED THEREFOR

FIELD

The present disclosure generally relates to a fence assembly for a work table and more specifically to a sled assembly for guiding movement of stock along the fence assembly and an outfeed fence assembly for adjusting an offset between infeed and outfeed guide planes defined by the table assembly.

BACKGROUND

Fence assemblies are used to guide movement of stock along a work table, such as a router table or table saw, in a feed direction. Fences are typically equipped with tracks that define races for slidably mounting various implements on the work table. For example, a sled assembly can be slidably mounted in a track to push stock in the feed direction. Oftentimes tracks are formed from metal or polymer extrusions, which can have relatively low manufacturing tolerances. Variations between tracks can alter the guide path of a sled assembly and adversely affect the quality of the finished stock.

Router tables are sometimes used to make full-face cuts in stock. A full-face cut occurs when a router element removes the entire face of material that is guided along the fence from the infeed side of the router element. After a full-face cut is made, the entire surface of the stock that engaged the fence assembly on the infeed side of the router element is removed from the stock on the outfeed side of the router element (the "out-fed stock"). To provide guiding support for the out-fed stock after being full-face cut, some fence assemblies are configured to adjust the position of the outfeed fence relative to the infeed fence. Typically adjustments are made using shims to provide backing for the outfeed fence and prevent unwanted flexure while guiding the out-fed stock.

SUMMARY

In one aspect, a sled assembly is configured to guide movement of stock along a length of a table fence mounted on a work table. The table fence defines a race extending along the length of the table fence and having a width. The sled assembly comprises a carriage configured to be supported on the table fence for movement along the length of the table fence. The carriage comprises a body having a first end portion, an opposite second end portion, and a length extending from the first end portion to the second end portion. The length of the carriage body extends generally parallel to the length of the table fence when the carriage is supported on the table fence. A sled fence is connected to the carriage for movement with the carriage along the length of the table fence. The sled fence is configured for operatively engaging the stock to guide movement of the stock with the sled fence along the length of the table fence in a feed direction. A roller assembly comprises first and second rollers mounted on the carriage at spaced apart positions along the length of the carriage body for rotation with respect the carriage. The first and second rollers are configured to engage the table fence when the carriage is supported on the table fence to guide movement of the carriage along the length of the table fence and each of the first and second rollers have a peripheral portion shaped and arranged for being received in the race. The roller assembly further comprises an adjustable roller mount mounting the first roller on the carriage body. The adjustable roller mount is configured for selectively adjusting a position of the first roller with respect to the carriage generally along an adjustment axis oriented transverse to the length of the carriage to align the peripheral portions of the first and second rollers with the width of the race.

In another aspect, an adjustable fence assembly guides movement of stock in a feed direction along a work table comprising a working element. The fence assembly comprises an infeed fence securable to the work table at an infeed side of the working element. The infeed fence has an infeed guide face extending in an infeed guide plane oriented generally parallel to the feed direction for engaging the stock and guiding movement of the stock toward the working element in the feed direction. An outfeed fence assembly comprises an outfeed fence support securable to the work table at an outfeed side of the working element. An outfeed fence movably mounted on the outfeed fence support has a first end, an opposite second end, and a length extending between the first and second ends. The outfeed fence has an outfeed guide face extending along the length in an outfeed guide plane oriented generally parallel to the feed direction for engaging the stock and guiding movement of the stock away from the working element in the feed direction. An outfeed fence adjustment mechanism comprises first and second mounting posts attached to the outfeed fence at spaced apart locations along the length thereof. Each of the first and second mounting posts is operatively connected to the outfeed fence support for selective movement with respect to the outfeed fence support along a fence adjustment axis oriented transverse to the feed direction. Said movement of the first and second mounting posts drives corresponding movement of the outfeed fence with respect to the outfeed fence support and the infeed fence to selectively adjust an offset distance between the outfeed guide plane and the infeed guide plane along the fence adjustment axis.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
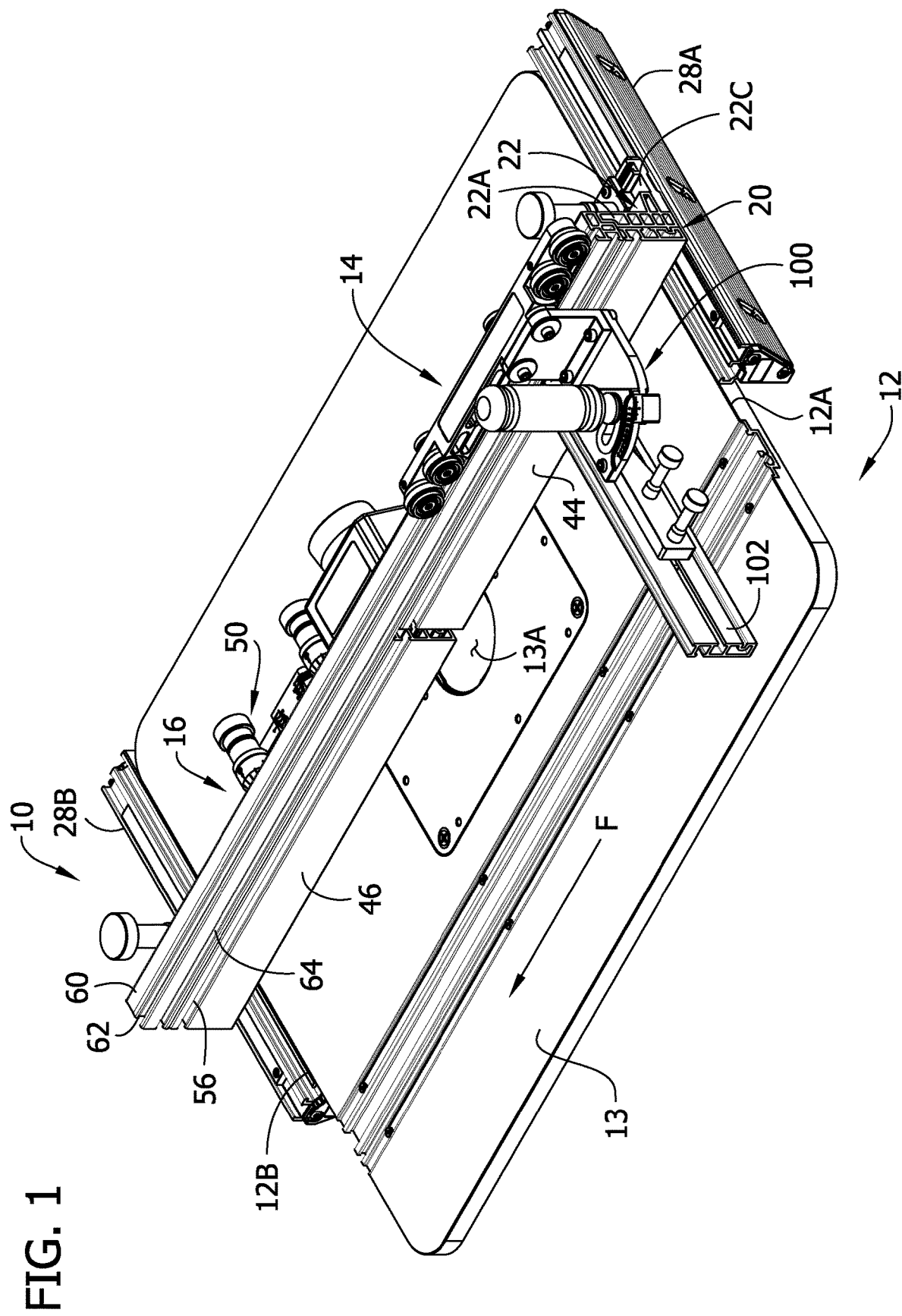
FIG. 1 is a perspective of a fence assembly operatively mounted on a work table.
Figure 2:
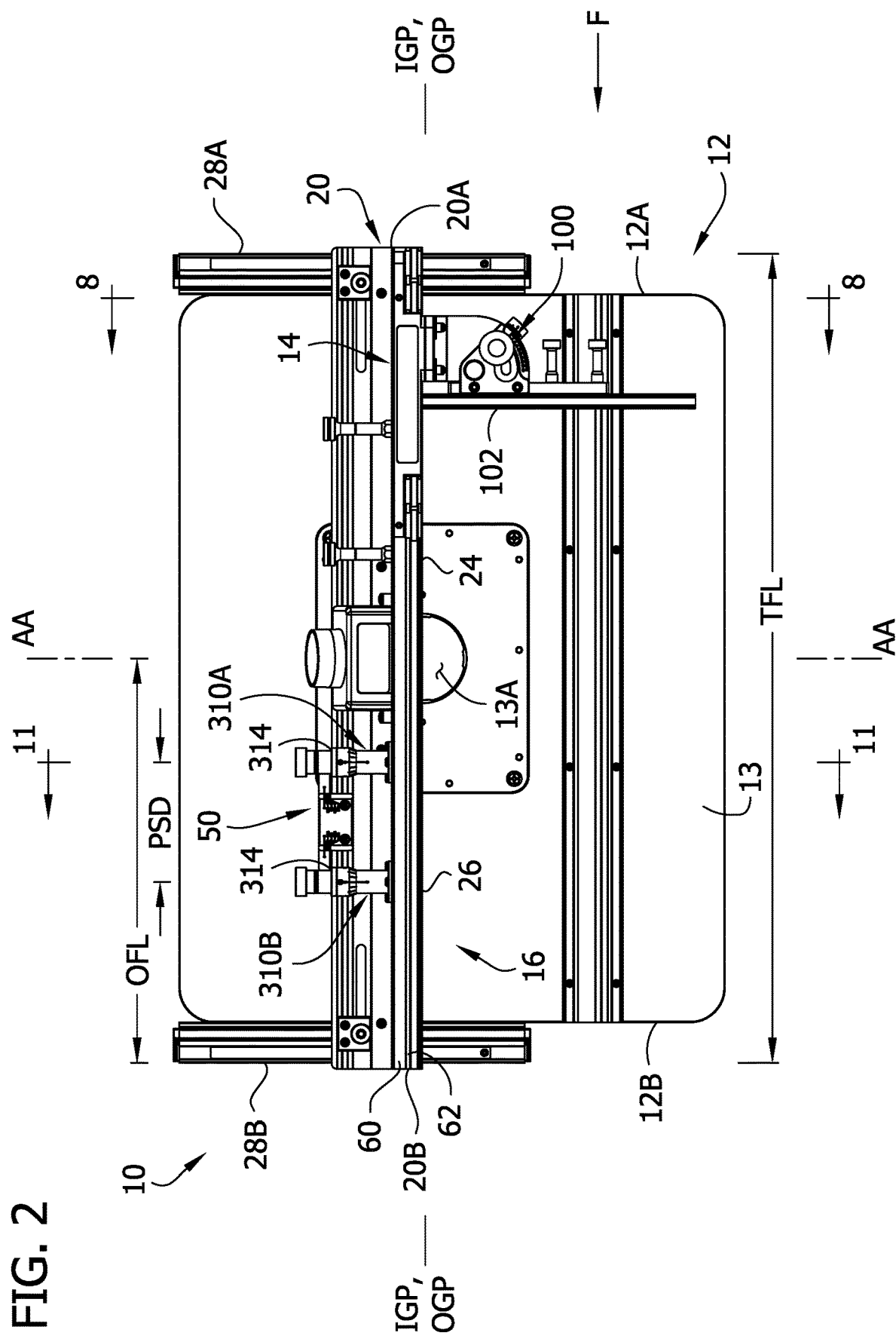
FIG. 2 is a top plan view of the fence assembly mounted on the work table.

Referring to FIGS. 1 and 2, a table fence assembly for guiding movement of stock along a work table 12 in a feed direction F is generally indicated at reference number 10. In the illustrated embodiment the work table 12 is a router table, but features of the fence assembly 10 can also be used in combination with other kinds of work tables (e.g., table saws, etc.) without departing from the scope of the invention. The router table 12 defines a horizontal work surface 13 and has an infeed end 12A and an opposite outfeed end 12B spaced apart from one another in the feed direction F. The router table 12 includes a router opening 13A through which a rotating router bit (broadly, a working element; not shown) projects to work or shape stock as it is guided along the work surface 13 and the table fence assembly 10. The illustrated table fence assembly 10 includes both a sled assembly, generally indicated at 14, and an adjustable outfeed fence assembly, generally indicated at 16. As explained in further detail below, the sled assembly 14 is configured to guide movement of stock along the table fence assembly 12 in the feed direction and the outfeed fence assembly 16 is adjustable to selectively establish an offset between an infeed guide plane IGP and an outfeed guide plane OGP defined by the table assembly 10 to provide support for stock on an outfeed side of the router bit when the router bit is used to make a full-face cut. As shown in FIGS. 1 and 2, the infeed guide plane IGP and outfeed guide plane OGP are coincident with each other.

Figure 3:
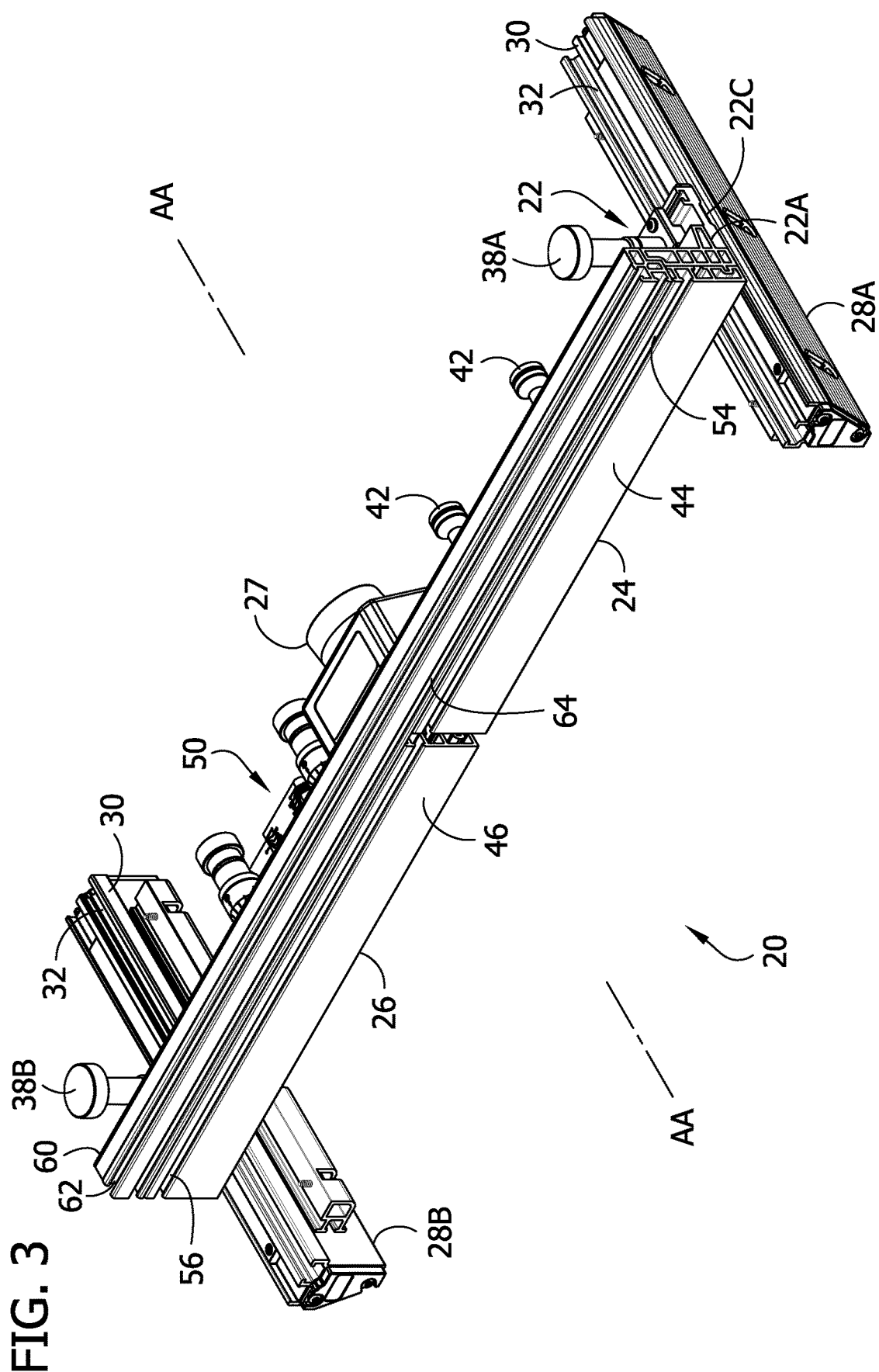
FIG. 3 is a front perspective of a table fence of the fence assembly.
Figure 4:
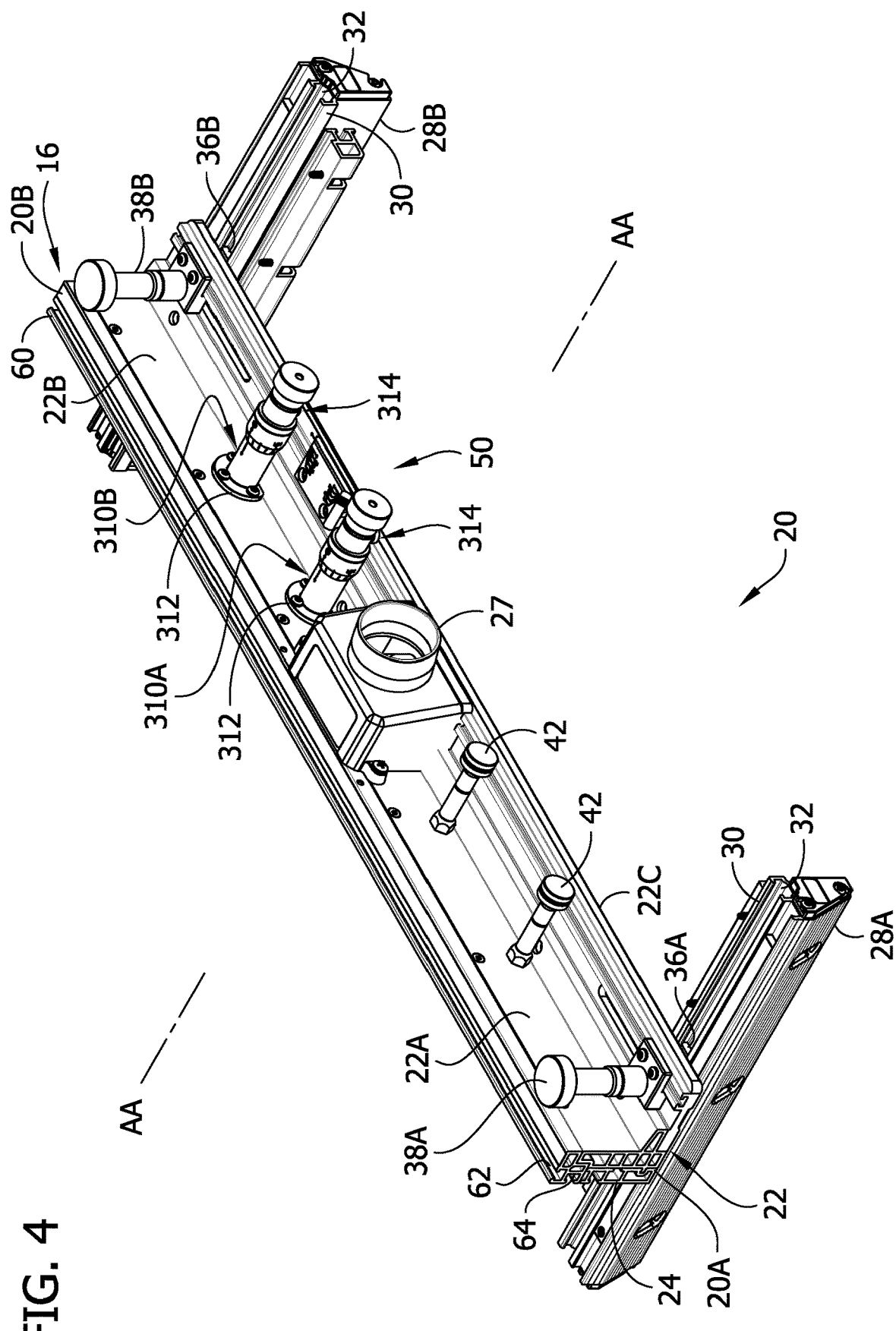
FIG. 4 is a rear perspective of the table fence.
Figure 5:
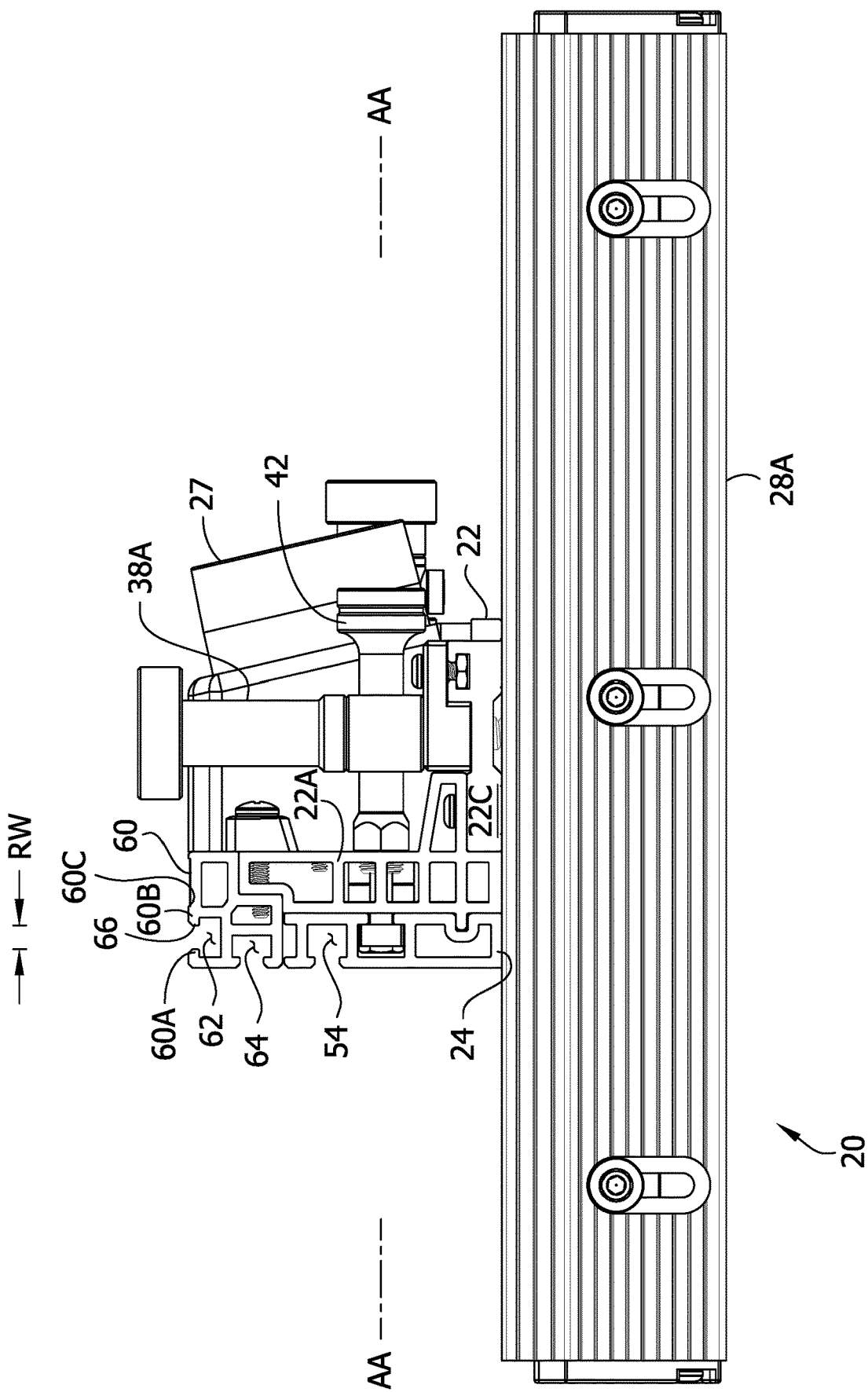
FIG. 5 is an infeed end elevation of the table fence.

Referring to FIGS. 3-5, the table fence assembly 10 includes a table fence, generally indicated at 20, that can be selectively secured to the work table 12 to define the infeed and outfeed guide planes IGP, OGP. The table fence 20 includes a fence base assembly, generally indicated at 22, and infeed and outfeed fences 24, 26 that are mounted on the base assembly. The outfeed fence 26 is a component of the adjustable outfeed fence assembly 16 as discussed in further detail below. The infeed fence 24 defines an infeed end 20A of the table fence 20 and the outfeed fence 26 defines an outfeed end 20B spaced apart from the infeed end in the feed direction F along a table fence length TFL (FIG. 2). The base assembly 22 includes an upright infeed base member 22A and an upright outfeed base member 22B secured to a bottom base member 22C that, in the illustrated embodiment, extend the length TFL of the table fence 20. The upright infeed base member 22A and the upright outfeed base member 22B have respective inboard end portions that are spaced apart from one another to define an opening (not shown) that is generally aligned with the router bit in use. A saw dust collection fitting 27 is attached to the inboard end portions of the upright base members 22A, 22B for fluidly coupling the opening to a vacuum of a saw dust collection system (not show) for extracting saw dust from the router table 12 in use.

Infeed and outfeed fence mounts 28A, 28B are attached to the infeed and outfeed ends 12A, 12B of the work table 12 for selectively mounting the fence base assembly 22 on the work table at a desired distance from the router bit along an adjustment axis AA. Each fence mount 28A, 28B includes a track 30 that forms a race 32 extending generally along the adjustment axis AA for guiding movement of the table fence 20 along the adjustment axis. In the illustrated embodiment, each track 30 comprises an extruded aluminum channel that defines an elongate T-slot that forms the race 32.

As shown in FIG. 4, the table fence 20 further comprises an infeed guide member 36A that is slidably received in the race 32 of the infeed fence mount 28A and an outfeed guide member 36B that is slidably received in the race of outfeed fence mount 28B. Infeed and outfeed clamping screws 38A, 38B are mounted on the bottom base member 22C in general alignment with the tracks 30 of the infeed and outfeed fence mounts 28A, 28B. The clamping screws 38A, 38B are threadably engaged with the respective guide member 36A, 36B to selectively clamp the guide member to the track 30 of the respective fence mount 28A, 28B. To adjust the position of the table fence 20 along the adjustment axis AA, a user loosens the clamping screws 38A, 38B and pushes the table fence forward or backward along the adjustment axis AA. The guide members 36A, 36B slide along the races 32 to maintain the table fence 20 in an orientation that is substantially parallel to the feed direction F. In the desired position, the clampdown screws 38A, 38B are again tightened to secure the table fence 20 in position.

Referring to FIG. 3, each of the infeed fence 24 and the outfeed fence 26 is mounted on the base assembly 22 in a generally upright orientation. Infeed clamping screws 42 threadably secure the infeed fence 24 to the upright infeed base member 22A and can be loosened by hand for selectively removing or replacing the infeed fence as desired. As discussed in further detail below, an outfeed fence adjustment mechanism, generally indicated at 50, mounts the outfeed fence 26 on the upright outfeed base member 22B and is configured for selectively adjusting the position of the outfeed fence along the adjustment axis AA.

As shown in FIG. 3, each fence 24, 26 has a respective guide surface 44, 46 that is substantially planar. The guide surfaces 44, 46 are oriented generally perpendicular to the work surface 13 of the work table 12 and generally parallel to the feed direction F. The guide surfaces 44, 46 extend vertically from a bottom edge margin adjacent the work surface 13 to an opposite top edge margin. In use, the guide surfaces 44, 46 face and engage the stock as it is guided along the table fence 20 in the feed direction F. The infeed guide surface 44 defines the infeed guide plane IGP (FIG. 2) and the outfeed guide surface 46 defines the outfeed guide plane OGP, each of which is oriented substantially parallel to the feed direction. In the illustrated embodiment, each of the infeed and outfeed fences 24, 26 defines a T-slot 54, 56 extending along the guide surface 44, 46 adjacent the top edge margin thereof. The T-slots 54, 56 are configured to slidably receive various implements that may be attached to the work table 12 in use. It is understood that the infeed and outfeed fences can have other configurations in other embodiments.

The table fence 20 further includes a track 60 that is mounted on the fence base assembly 22 to define the top of the table fence. In the illustrated embodiment, the track 60 is located above the infeed and outfeed fences 24, 26 but is not directly attached to either. Thus, the outfeed fence adjustment mechanism 50 can be used to adjust the position of the outfeed fence 26 without changing the position of the track 60. Moreover, the infeed fence 24 can be removed or replaced without removing the track 60 from the table fence 20. The track 60 extends in the feed direction F along substantially the entire table fence length TFL from an infeed end to an outfeed end. In one or more embodiments, the track 60 is formed by extrusion. The track 60 can comprise any suitable material, such as aluminum or another metal, various types of dimensionally stable polymers, etc. Referring to FIG. 5, the track 60 defines a top race 62 and a side race 64, each configured for slidingly receiving various implements that may be attached to the work table 12 in use. In the illustrated embodiment, each of the races 62, 64 is formed by an elongate T-slot, but races of other configurations may also be used without departing from the scope of the invention. The top race 62 opens at the top of the table fence 20 and the side race 64 opens on the side of the table fence that faces the stock in use.

The track 60 is configured to operatively connect the sled assembly 14 to the table fence 20 so that the top race 62 guides movement of the sled assembly 14 along the table fence in the feed direction F. In particular, as shown in FIG. 5, the track 60 includes first and second side portions 60A, 60B and a generally planar top surface 60C. The side portions 60A, 60B define a race opening 66 and a width RW of the race 62. As explained below, the first and second side portions 60A, 60B and the top surface 60C are configured to engage the sled assembly 14 to guide movement of the sled assembly along the table fence 20 in the feed direction F.

Figure 6:
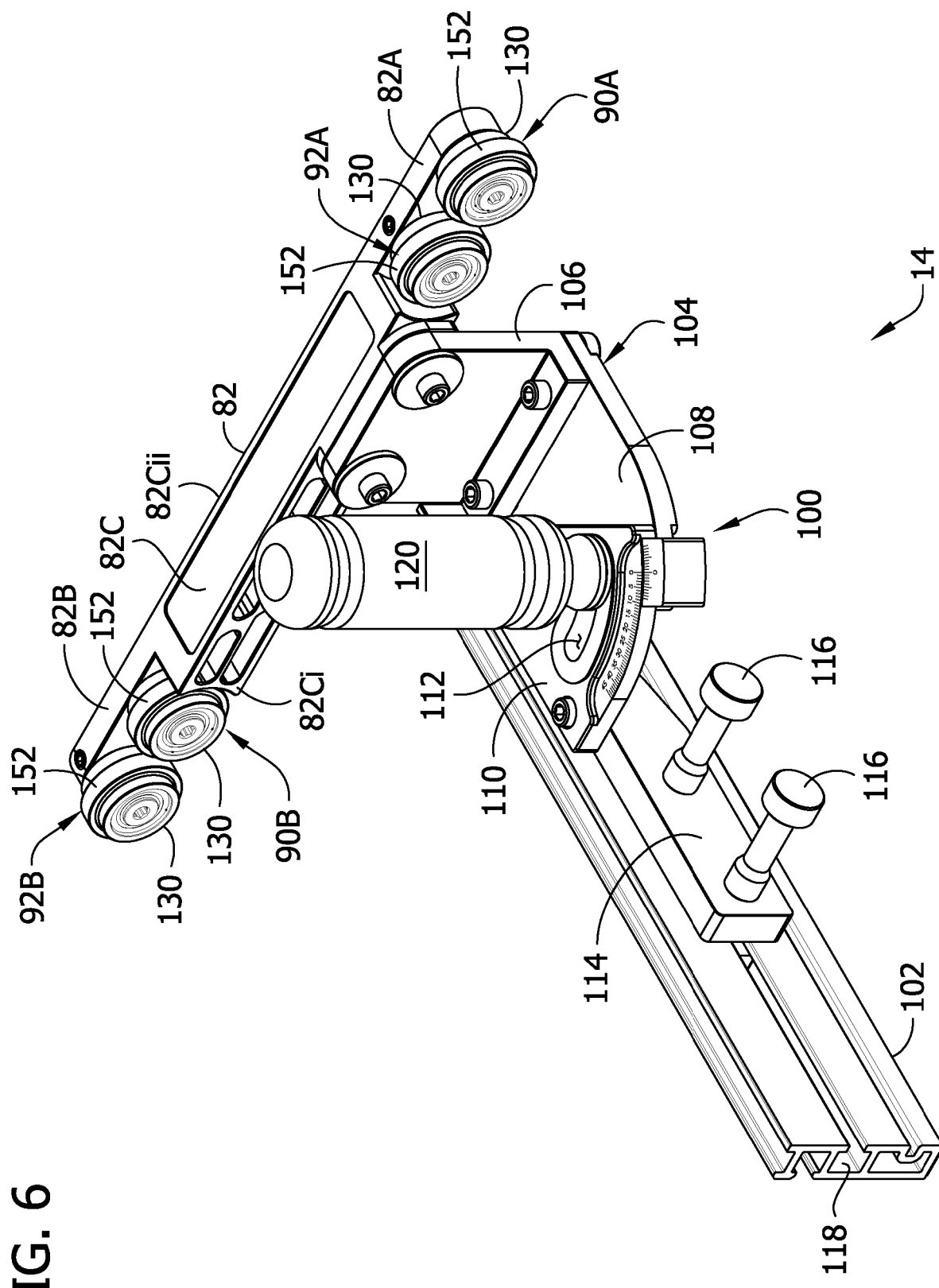
FIG. 6 is a front perspective of a sled assembly of the fence assembly.
Figure 7:
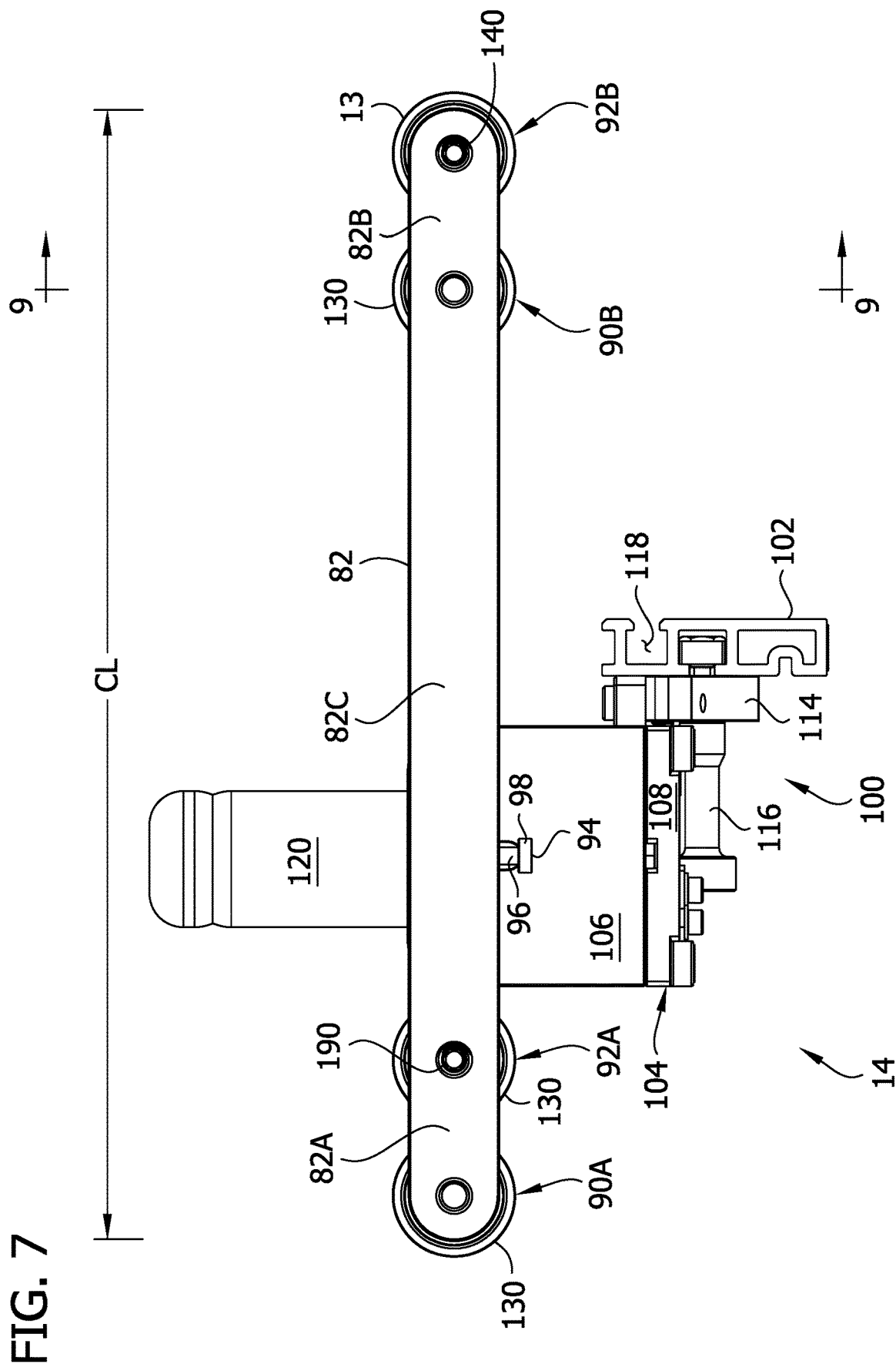
FIG. 7 is a rear elevation of the sled assembly.

Referring to FIGS. 6 and 7, the sled assembly 14 includes a carriage 82 configured to be supported on the table fence 20 for movement along the length TFL of the table fence. The carriage 82 comprises a body having an infeed end portion 82A, an opposite outfeed end portion 82B, and a length CL extending from the infeed end portion to the outfeed end portion. In the illustrated embodiment, the carriage body 82 is machined from a single piece of material such as aluminum or another metal, a rigid plastic, etc. As shown in FIGS. 1 and 7, the length CL of the carriage body 82 extends generally parallel to the length TFL of the table fence 20 when the carriage is supported on the table fence. Referring again to FIGS. 6 and 7, the carriage body 82 has an intermediate fence mounting portion 82C extending between the end portions 82A, 82B. The fence mounting portion has a stock facing side 82Ci and an opposite side 82Cii that are spaced apart along a width of the carriage body as shown in FIG. 6. The end portions of 82A, 82B of the carriage body 82 are narrower than the fence mounting portion 82C to provide space for receiving rollers 90A, 90B, 92A, 92B along the width of the carriage body, substantially inboard of the sides 82Ci, 82Cii. The relatively large width of the fence mounting portion 82C positions the stock facing side 82Ci of the carriage body 82 so that it is aligned with or protrudes slightly beyond the infeed guide plane IGP when the carriage is operatively mounted on the table fence 20.

Figure 8:
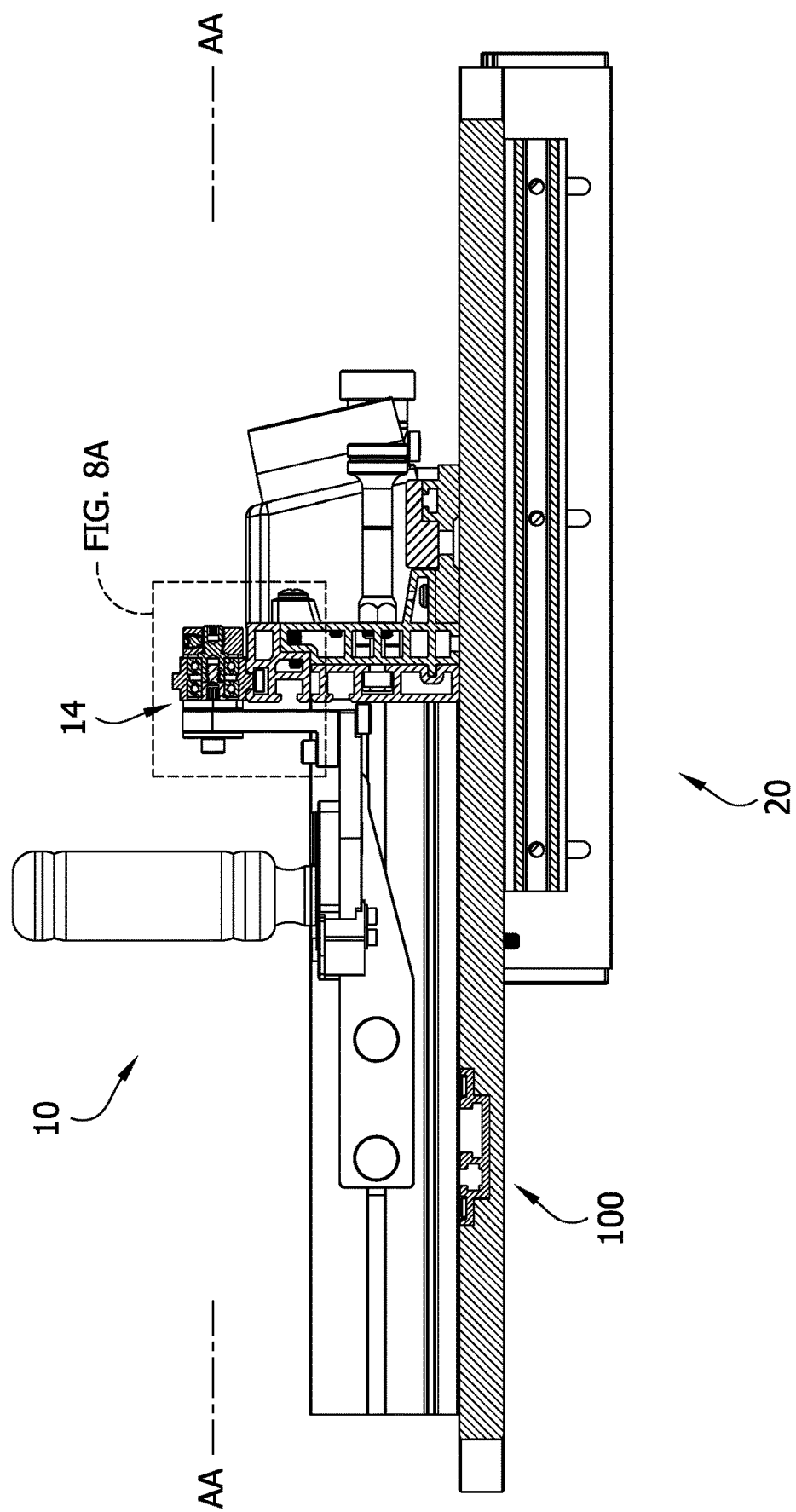
FIG. 8 is a section taken in the plane of line 8-8 of FIG. 2.
Figure 8A:
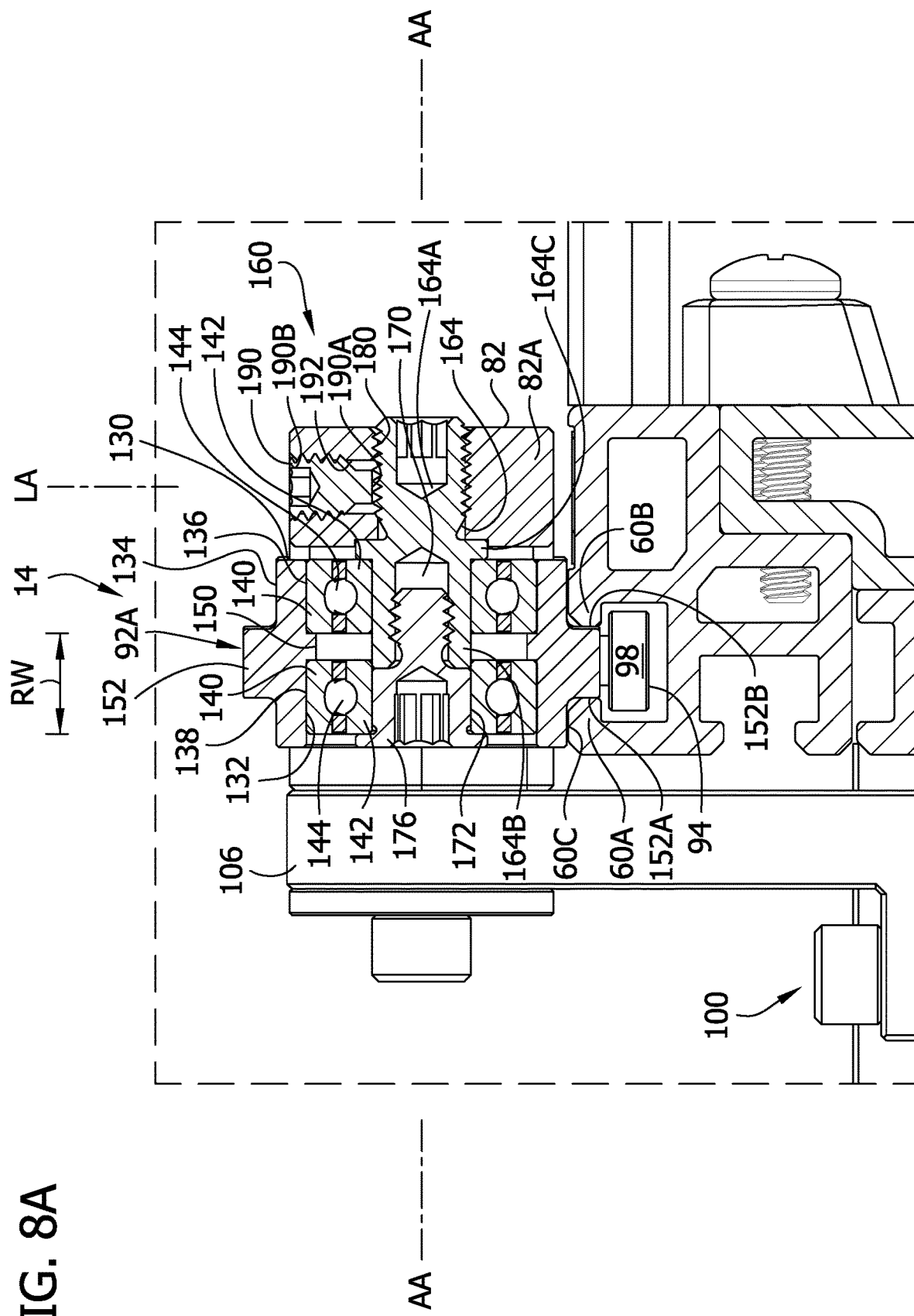
FIG. 8A is an enlarged, fragmentary view of FIG. 8.

As shown in FIG. 7, a race connection pin 94 extends from the bottom of the fence mounting portion 82C of the carriage body 82. The race connection pin 94 includes a narrow shaft portion 96 that protrudes from the bottom of the carriage body 82 and an enlarged head portion 98 that defines a bottom end of the pin. As shown in FIGS. 8 and 8A, the pin 94 is shaped and arranged for being slidably received in the top race 62 to slidably secure the carriage 82 to the track 60. When the pin 94 is received in the race 62, the shaft portion 96 extends through the race opening 66 and outer margins of the head portion 98 underlie the side portions 60A, 60B of the track 60. The head portion 98 is sized and arranged to engage the side portions 60A, 60B of the track 60 so that it is captured by the track and prevents the sled assembly 14 from being lifted upward from the track in use.

Referring to FIG. 6, a miter fence assembly (broadly, a sled fence), generally indicated at 100, is connected to the carriage 82 for movement with the carriage along the length TFL of the table fence 20, the miter fence assembly 100 includes a miter fence 102 that is configured for operatively engaging the stock to guide movement of the stock along the length TFL of the table fence 20 in the feed direction F. The miter fence assembly 100 also includes an adjustable fence mount, generally indicated at 104, for adjusting a miter angle of the miter fence 102 with respect to the table fence 20. The adjustable fence mount 104 includes a mounting panel 106 that is fastened to the fence mounting portion 82C of the carriage 82 body and extends downward therefrom. A horizontal support plate 108 is fastened to the bottom end portion of the mounting panel 106 and a miter plate 110 defining an arcuate miter adjustment slot 112 connects the miter fence 102 to the support plate. A miter fence positioning plate 114 is fastened to the miter plate 110 and movably secured to the rear of the miter fence 102. In the illustrated embodiment, screw clamps 116 extending through the miter fence positioning plate 114 are slidably connected to a race 118 formed in the rear of the miter fence 102. When the screw clamps 116 are loosened, the miter fence 102 can be moved so that the screw clamps slide through the race 118 to selectively adjust a distance between the miter fence and the table fence 20. When tightened, the screw clamps 116 fix the miter fence 102 in place with respect to the miter fence positioning plate 114 to fix the distance between the miter fence and the carriage body 82. A miter angle screw 120 extends through the miter slot 112 and is threadably connected to the support plate 108. When the miter angle screw 120 is loosened, the miter plate 110 can be moved relative to the screw so that the screw travels through the slot 112 for selectively adjusting the miter angle of the miter fence 102. Tightening the miter screw 120 fixes the miter angle with respect to the length CL of the carriage body 82. The miter screw 120 has a large diameter and forms the handle of the sled assembly 14. A user can grip the miter screw 120, which is spaced apart above the work table 12 and router bit, when pushing the stock in the feed direction F.

Referring to FIG. 6, the rollers 90A, 90B, 92A, 92B, which together form a roller assembly, are mounted on the carriage 82 at spaced apart positions along the length CL of the carriage body for rotation with respect to the carriage body. The rollers 90A, 90B, 92A, 92B are configured to engage the table fence 20 when the carriage 82 is supported on the table fence to guide movement of the carriage along the length TFL of the table fence. In the illustrated embodiment, the sled assembly 14 includes four rollers, an infeed fixed roller 90A, an infeed adjustable roller 92A, an outfeed fixed roller 90B, and an outfeed adjustable roller 92B. The infeed rollers 90A, 92A are mounted at closely spaced apart positions along the infeed end portion 82A of the carriage 82, and the outfeed rollers 90B, 92B are mounted at closely spaced apart positions along the outfeed end portion 82B of the carriage. Other sled assemblies can have other numbers and arrangements of rollers without departing from the scope of the invention.

Figure 9:
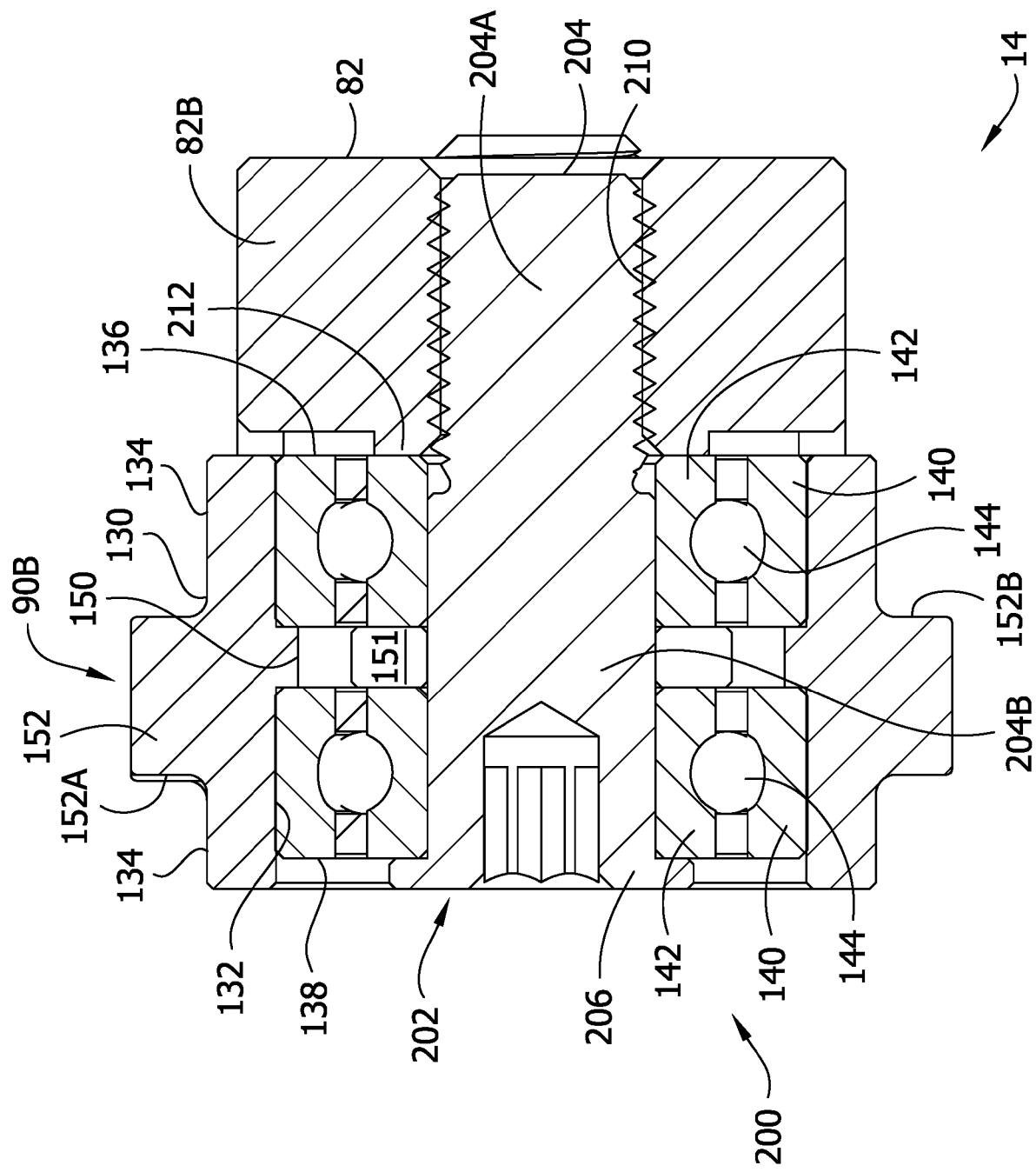
FIG. 9 is a section taken in the plane of line 9-9 of FIG. 7.

Referring to FIGS. 8, 8A, and 9, each of the rollers 90A, 90B, 92A, 92B has a substantially identical construction in the illustrated embodiment. Each roller 90A, 90B, 92A, 92B comprises a roller body 130 that has a generally annular shape. The roller body 130 has a radially inwardly facing surface 132 defining a hub opening and a radially outwardly facing tread surface 134. The hub opening of each roller 90A, 90B, 92A, 92B is shaped and arranged for receiving first and second roller bearings 136, 138 for rotatably mounting the roller on the carriage body 82 as described in further detail below. As is known in the art, each roller bearing 136, 138 comprises an outer race 140 secured to the inner surface 132 of the roller body 130, an inner race 142 for being secured to an axle as described below, and a plurality of ball bearings 144 received between the inner and outer races. The illustrated roller bodies 130 comprise an inwardly projecting spacing element 150 for engaging the inboard sides of the outer races 140. The rollers 90A, 90B also each comprise a washer 151 for engaging the inboard sides of the inner races 142. The spacing element 150 and the washer 141 maintain axial separation between the first and second bearings 136, 138 in use.

Each roller body 130 further includes a peripheral portion forming a radially extending projection 152 that extends radially outwardly from the tread surface 134. Each projection 152 is shaped and arranged for being received in the top race 62 of the track 60. When the projection 152 is received in the race 62, the tread surface 134 is configured to engage a top surface 60C of the track 60. The projection 152 of each of the rollers 90A, 90B, 92A, 92B has opposite first and second sides 152A, 152B. When received in the race 62, the first side 152A opposes the first side portion 60A of the track 60, the second side 152B opposes the second side portion 60B of the track, and the tread 134 operatively engages the top surface 60C of the track 60 for rolling along the top surface. As explained below, the position of the adjustable rollers 92A, 92B along the adjustment axis AA is selectively adjustable to ensure that the projections 152 of at least two of the rollers are aligned with the width RW of the race 62. More specifically, the adjustable rollers 92A, 92B are adjustable so that the first side 152A of the projection 152 of at least one of the four rollers 90A, 90B, 92A, 92B is positioned in generally parallel engagement with the first side portion 60A of the track 60 and the second side 152B of the projection of at least one other of the four rollers is positioned in generally parallel engagement with the second side portion 60B of the track. This enables the sled assembly 14 to account for differences in the race widths RW of different tracks 60 that occur, for example, because of poor dimensional tolerances associated with extrusion of the track.

As shown in FIG. 8A, an adjustable roller mount 160 mounts each of the adjustable rollers 92A, 92B on the carriage 82. (Only the adjustable roller mount 160 for the infeed adjustable roller 92A is shown in FIG. 8, but it is understood that the adjustable roller mount for the outfeed adjustable roller 92B has substantially the same construction.) The adjustable roller mount 160 comprises a mounting stem 164 which forms the axle of the roller 92A. The mounting stem 164 comprises a threaded screw portion 164A, an axle portion 164B and a bearing flange 164C extending radially outward at a location between the screw portion and the axle portion. Each adjustable roller 92A, 92B is configured to be received over the axle portion 164B such that the inner race 142 of the first roller bearing 136 engages the axle portion. The axle portion 164B defines a threaded socket 170 extending along the adjustment axis AA and configured to threadably receive a roller mounting screw 172 therein. When the roller 92A, 92B is received over the axle portion 164B and the roller mounting screw 172 is threadably received in the threaded socket 170, the inner race 142 of the second roller bearing 138 engages a non-threaded bearing surface of the roller mounting screw. The roller mounting screw 172 has a radially outwardly extending head portion 176 configured to engage the outboard side of the inner race 142 of the second roller bearing 138. When the roller mounting screw 172 is threadably tightened into the threaded socket 170, the bearings 136, 138 are secured against the spacing element 150 between the stem flange portion 164C and the screw head portion 176 to secure the roller 92A, 92B on the mounting stem 164.

Each end portion 82A, 82B of the carriage body 82 defines a threaded stem opening 180 extending along the adjustment axis AA and configured for threadably receiving the screw portion 164A of the mounting stem 164. The stem opening 180 extends through the entire width of the end portion 82A, 82B of the carriage body 82 so that the free end of the screw portion 164A is accessible through the opening from the side of the carriage body. The free end of the screw portion 164A defines a tool formation for receiving the working end of a turning tool, such as an Allen wrench, a screwdriver, etc. Rotating the mounting stem 164 about its axis causes the screw portion 164A to be threadably advanced or withdrawn through the stem opening 180 and move along the adjustment axis AA. When the roller 92A, 92B is secured to the axle portion 164B using the mounting screw 172, movement of the mounting stem 164 drives corresponding movement of the roller along the adjustment axis AA.

The adjustable roller mount 160 further includes a locking screw 190 (broadly, a locking member) that is selectively engageable with the screw portion 164A of the mounting stem 164 to fix or lock the mounting stem in position with respect to the carriage 82. The carriage body 82 defines a threaded locking member opening 192 extending along a locking axis LA transverse to the adjustment axis AA (e.g., in the illustrated embodiment, the locking axis LA is oriented perpendicular to the adjustment axis AA). The locking member opening 192 extends from the top of the carriage body 82 along the locking axis LA to intersect the stem opening 180. The locking member opening 192 is configured for threadably receiving the locking screw 190 for threaded movement toward and away from the stem opening 180 along the locking axis LA. The locking screw 190 comprises a locking end 190A for engaging threads of the screw portion 164A of the mounting stem 164 within the locking opening 192. The locking screw 190 also has a tool end 190B defining a tool receiving formation for matingly receiving the working end of a turning tool, such as an Allen wrench, a screwdriver, etc. The locking screw 190 is accessible from the top of the carriage body 180 through the top end of the locking member opening 192 for selectively rotating the locking screw about the locking axis LA. When repositioning the adjustable roller 92A, 92B, the locking screw 190 is rotated to threadably withdraw the locking screw away from the screw portion 164A of the mounting stem 164, thus permitting the mounting stem to be threadably rotated through the stem opening 180 to adjust the position of the roller. When the roller 92A, 92B is in the desired position, the locking screw 190 is rotated to threadably advance the screw in the opposite direction until the locking end 190A of the screw presses against the threads of the screw portion 164C to inhibit the screw portion 164A from threadably rotating to move the stem from the desired position. The locking screw could be configured to engage a portion of a mounting stem other than the screw portion in other embodiments.

Referring to FIGS. 6 and 9, a fixed roller mount, generally indicated at 200, is configured to mount each of the fixed rollers 90A, 90B on the respective end portion 82A, 82B of the carriage body 82 in spaced apart relationship with the adjustable roller 92A, 92B. (FIG. 9 illustrates only the fixed roller mount 200 at the outfeed end portion 82B of the carriage body 82, but it is understood that the fixed roller mount for the roller 90A at the infeed end portion of the carriage body has a substantially identical construction.) In the illustrated embodiment, the fixed roller mount 200 includes a screw 202 comprising a shaft 204 and a head 206. The shaft 204 includes a threaded end portion 204A and a non-threaded end portion 204B. The threaded end portion 204A of the shaft 204 is threadably received in a fixed roller mount opening 210 formed in the carriage body 82. The fixed roller 90A, 90B is received over the non-threaded end portion 204B of the shaft 204 such that the inner race 142 of each of the roller bearings 136, 138 engages the non-threaded portion of the shaft and the outer sides of the inner races are compressively secured between the head 206 of the screw 202 and an annular projection 212 of the carriage body 82 shaped and arranged so that it does not extend radially beyond the outer perimeter of inner race. When the screw 202 is threadably tightened into the roller mount opening 210, it thus secures the fixed roller 90A, 90B to the carriage body for rotation about the screws. In the illustrated embodiment, when the screws 202 fixedly secure the fixed rollers 90A, 90B to the carriage body, the positions of the fixed rollers are generally aligned along the adjustment axis AA.

Referring to FIGS. 1, 6, and 8A, a method of using the sled assembly 14 will now be briefly described. Before or after the table fence 20 is installed on the work table 12 at the desired position along the adjustment axis AA, the user can mount the sled assembly 14 on the track 60. The sled assembly 14 is positioned at one end of the track 60 so that the race connection pin 94 is generally aligned with the race 62. Then the user moves the carriage body 82 along the length of the track 60 so that the head 98 of the connection pin 94 slides into the race 62 to connect the sled assembly 18 to the table fence 20. Typically, sliding the pin 94 into the race 62 will cause the projections 152 of the rollers 90A, 90B, 92A, 92B to be received in the race opening 66 and the tread surfaces 134 of the rollers to be aligned with the track 60 for rolling along the top surface 62C.

If the race width RW is not substantially uniform the rollers 90A, 90B, 92A, 92B may not fit snugly in the race 60. This can cause undesired movement of the sled assembly 14 in use. To align the rollers 90A, 90B, 92A, 92B along the width RW of the race 62 (and thereby account for any unexpected variation in the width of the race), the user adjusts the position of one or both of the adjustable rollers 92A, 92B using the adjustable roller mount(s) 160. In general, the user adjusts the positions of at least one of the adjustable rollers 92A, 92B so that the first side portion 152A of the projection 152 of at least one of the four rollers 90A, 90B, 92A, 92B is positioned in generally parallel engagement with the first side portion 60A of the track 60 and the second side 152B of the projection of at least one other of the four rollers is positioned in generally parallel engagement with the second side portion 60B of the track. For example, in one embodiment, the user adjusts both of the adjustable rollers 92A, 92B so that both adjustable rollers operatively engage the same side portion 60A, 60B of the track 60 and both fixed rollers 90A, 90B engage the opposite side portion of the track.

Adjusting the adjustable rollers 92A, 92B comprises threadably withdrawing locking screws 190 through the locking member openings 192 to free the screw portions 164C of the mounting stems 164. When the locking ends 190A of the locking screws 190 are spaced apart from the screw portions 164C, the user then threadably advances or withdraws the mounting stem 164 through the stem openings 182 to move the adjustable rollers 92A, 92B with respect to the fixed rollers 90A, 90B to align the rollers along the width RW of the race. For example, in one embodiment, the user threadably advances the mounting stems 164 until the adjustable rollers 92A, 92B are located so that the first sides 152A of the projections 152 of the adjustable rollers 92A, 92B will engage the first side portion 60A of the track 60 and the second sides 152B of the projections of the fixed rollers 90A, 90B engage the second side portion 60B of the track. When the rollers 90A, 90B, 92A, 92B are positioned as desired, the user threadably advances the locking screws 190 toward engagement with the screw portions 164C of the mounting stems 164 to secure the adjustable rollers in position.

After the rollers 90A, 90B, 92A, 92B are properly aligned with the width of the race RW the user can use the sled assembly 14 to guide movement of stock along the table fence 20 in the feed direction. The user can first adjust the adjustable fence mount 104 to position the miter fence 102 at the desired miter angle and distance from the table fence 20. Then the user places stock on the work surface 13 in engagement with the miter fence 102 and the guide surface 44 of the infeed fence 24. With the stock operatively positioned on the work table, the user grips the miter angle screw 120 and pushes the carriage 82 of the sled assembly 14 along the track 60 in the feed direction F to advance the stock toward and through the router bit (not shown). The tread surfaces 134 of the rollers 90A, 90B, 92A, 92B roll along the top 60C of the fence 60, and the parallel engagement between the sides 152A, 152B of the projections 152 and the side portions 60A, 60B of the track 60 guides precise movement of the carriage in the feed direction F as it travels along the length TFL of the table fence 20. The miter fence 102 engages the stock to guide the stock in corresponding movement with the sled assembly 14 in the feed direction F.

Figure 10:
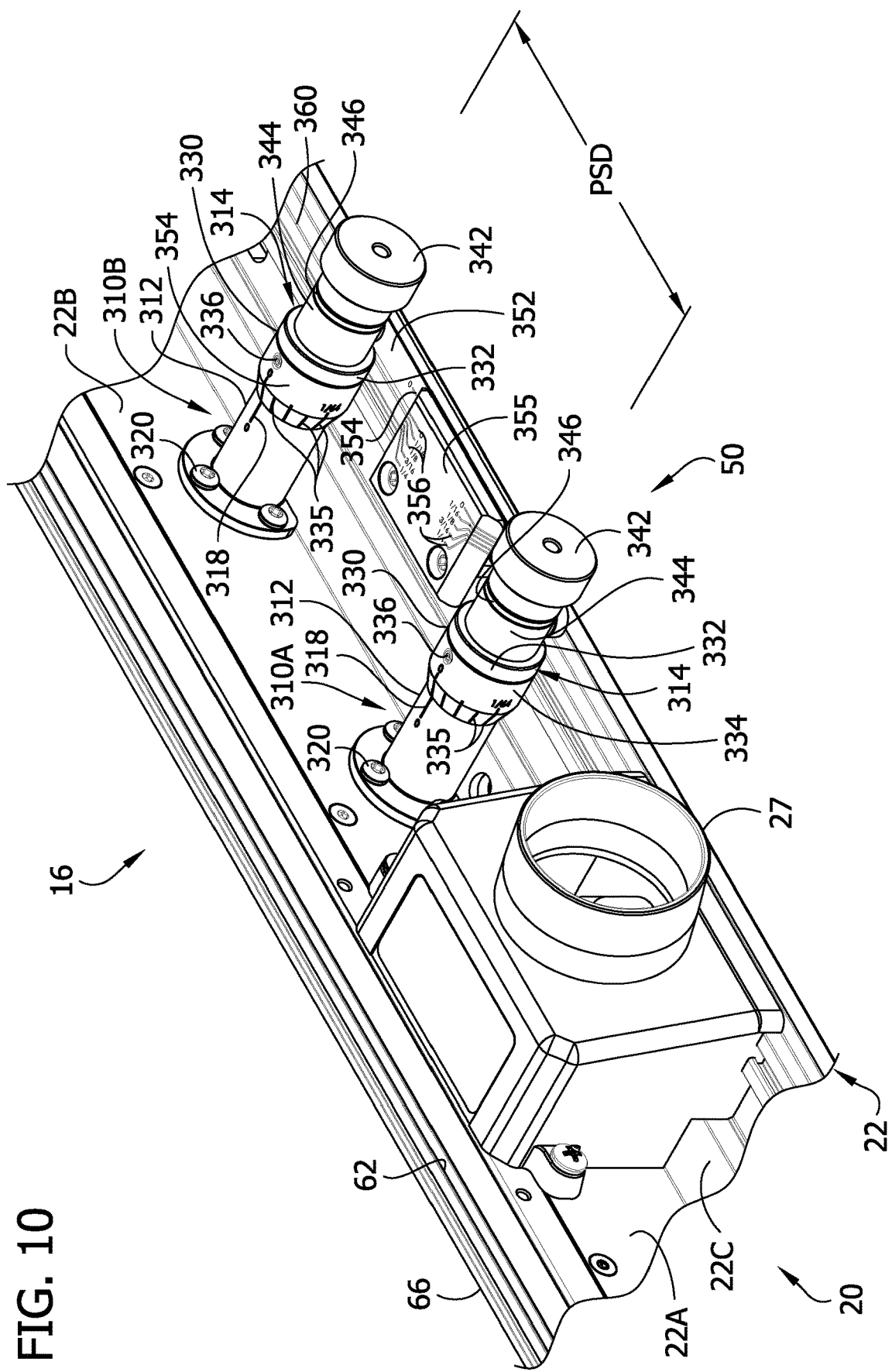
FIG. 10 is a fragmentary perspective of the table fence, illustrating an outfeed fence adjustment mechanism thereof.

Referring to FIGS. 1, 2, and 10, the outfeed fence assembly 16 will now be described in more detail. The outfeed fence assembly 16 includes the upright outfeed base member 22B, the outfeed fence 26, and the outfeed fence adjustment mechanism 50. As explained above, the outfeed base member 22B is fixedly secured to the work table 12 to form an outfeed fence support for movably securing the outfeed fence 26 to the table. As explained below, the outfeed fence adjustment mechanism 50 is configured to selectively adjust the position of the outfeed fence 26 relative to the outfeed base member 22B to adjust an offset between the infeed guide surface 44 and the outfeed guide surface 46. For example, when the router table 12 is configured for forming a full-face cut in the stock, the outfeed fence adjustment mechanism 50 can adjust the position of the outfeed fence 26 to provide support for the out-fed stock based on the width of material that is being removed in the cutting operation. As will be apparent, the outfeed fence adjustment mechanism 50 provides precise control of the positional adjustments to the outfeed fence 26 and provides rigid support of the outfeed fence when it is moved away from the upright outfeed base member 22B.

Figure 13:
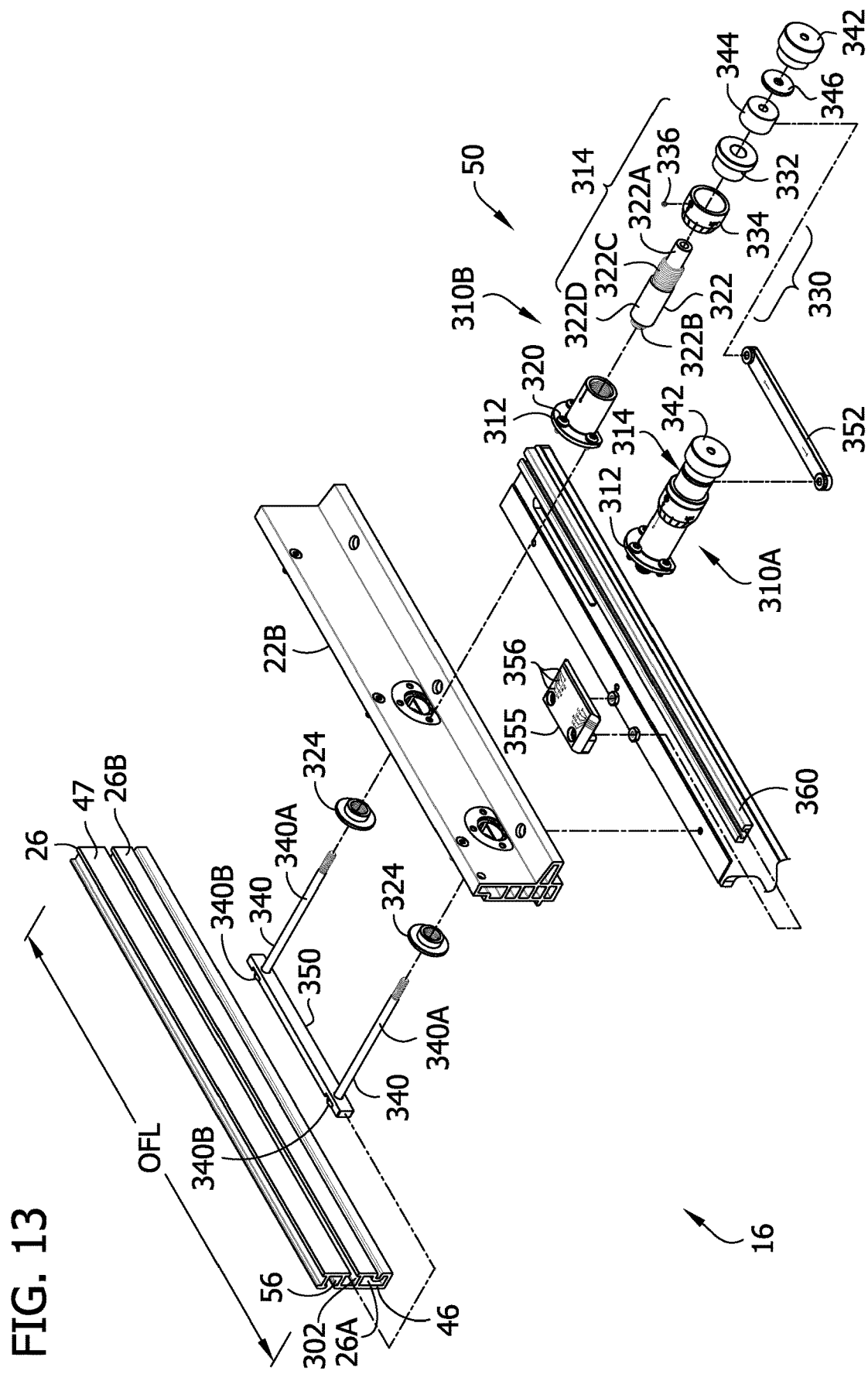
FIG. 13 is an exploded perspective of an outfeed fence assembly of the table fence which includes the outfeed fence adjustment mechanism.

Referring to FIG. 13, additional details about the outfeed fence 26 that are relevant to the outfeed fence adjustment mechanism 50 will be briefly described before discussing the components and operation of the outfeed fence adjustment mechanism in detail. The outfeed fence 26 has a first end 26A, a second end 26B, and a length OFL extending therebetween. The first end 26A of the outfeed fence 26 is spaced apart from the infeed fence 24 toward the outfeed end 20B of the table fence 20 and the second end 26B defines the outfeed end 20B of the table fence. The outfeed guide face 46 extends along the length OFL of the outfeed fence 26 in the outfeed guide plane OGP. The outfeed fence 26 has a mounting face 47 opposite the outfeed guide face 46 and defines a T-slot 302 that extends along the length OFL of the outfeed fence and opens toward the mounting face.

Referring to FIG. 10, the outfeed fence adjustment mechanism 50 comprises first and second screw mechanisms, generally indicated at 310A, 310B, that are spaced apart from one another along the length OFL of the outfeed fence 26. The illustrated screw mechanisms 310A, 310B are substantially identical. Each comprises an internally threaded mounting collar 312 that is fastened to the upright outfeed base member 22B and a mounting post 314 that is threadably received in the collar. Each mounting post 314 is attached to the outfeed fence 26 at a respective location along the length OFL for conjoint movement with the outfeed fence along the adjustment axis AA. As explained below, the screw mechanisms 310A, 310B are configured to selectively drive movement of the mounting posts 314 along the adjustment axis AA with respect to the upright outfeed base member 22B and the threaded collars 312. Movement of the posts 314 drives corresponding movement of the outfeed fence 26 with respect to the upright outfeed base member 22B and with respect to the infeed fence 24 to adjust the relative positions of the infeed and outfeed guide planes IGP, OGP.

As shown in FIG. 2, the mounting posts 314 of the first and second screw mechanisms 310A, 310B are spaced apart from one another by a post spacing distance PSD. As a result, when the screw mechanisms 310A, 310B are used to position the outfeed fence 26 at a spaced apart position with respect to the upright outfeed base member 22B, the mounting posts 314 still provide rigid backing for the outfeed fence at multiple locations along its length OFL. In one or more embodiments, the post spacing distance PSD is at least about 30% of the length OFL of the outfeed fence 24. In certain embodiments, the post spacing distance PSD is at least about 4 inches. An outfeed fence that is positioned by a single mounting post at one connection point along its length is strongly urged to pivot at the connection point of the post to the outfeed fence as forces are applied at locations the outfeed fence away from the connection point. The use of the two mounting posts 314 that are spaced apart by the post spacing distance PSD allows each post to resist the tendency of the outfeed fence 26 to pivot about the connection point with the other post. Thus, the two mounting posts 314 are thought to provide a more rigid mount for the outfeed fence 26, limiting flexure of the mounting fence (which can adversely affect the edge quality of the routed stock) during use. Although the illustrated embodiment uses two mounting posts 314, it will be understood that more than two mounting posts can also be used without departing from the scope of the invention.

Figure 11:
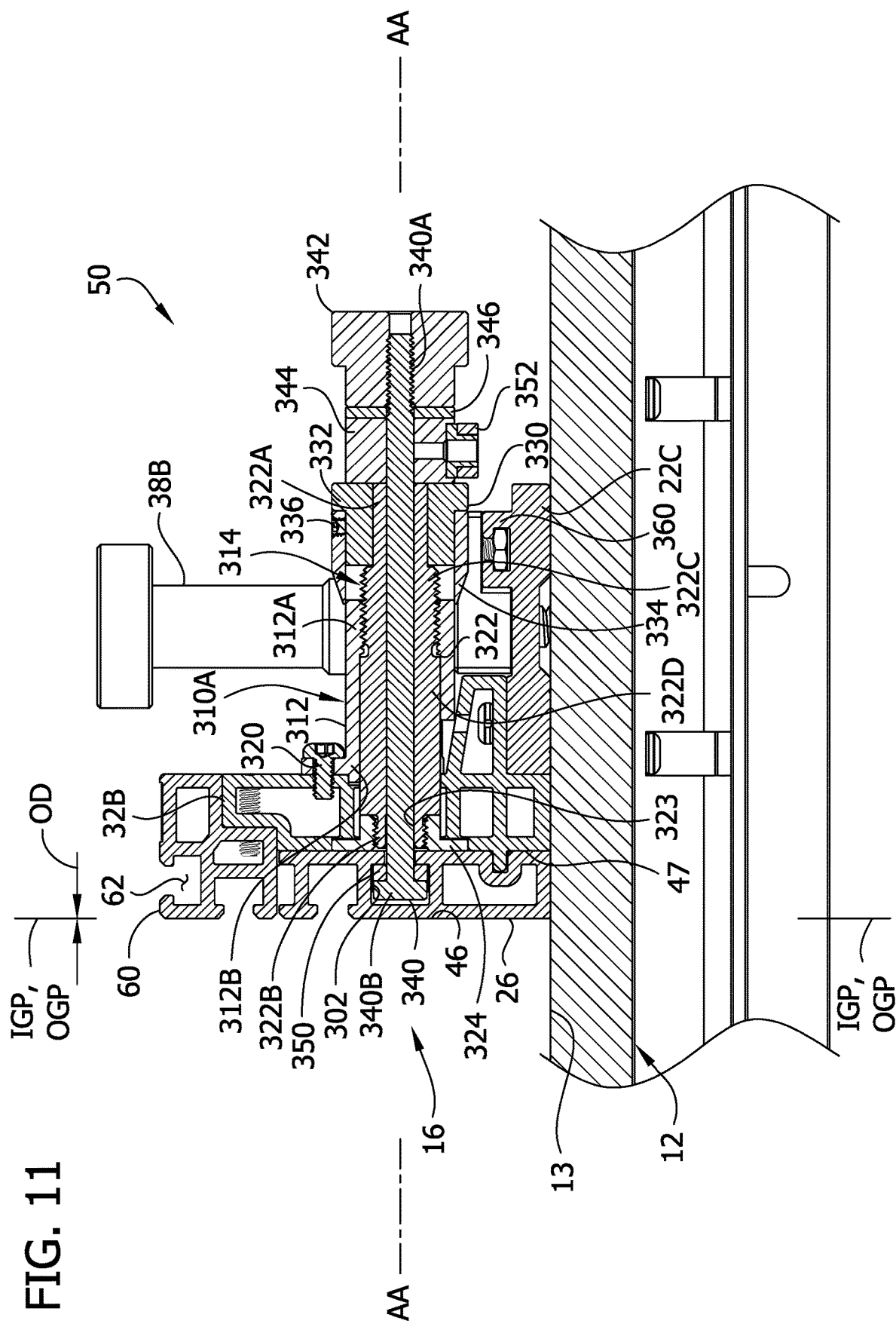
FIG. 11 is an enlarged, fragmentary section taken in the plane of line 11-11 of FIG. 2, illustrating a screw mechanism of the outfeed fence adjustment mechanism at a first end position.
Figure 12:
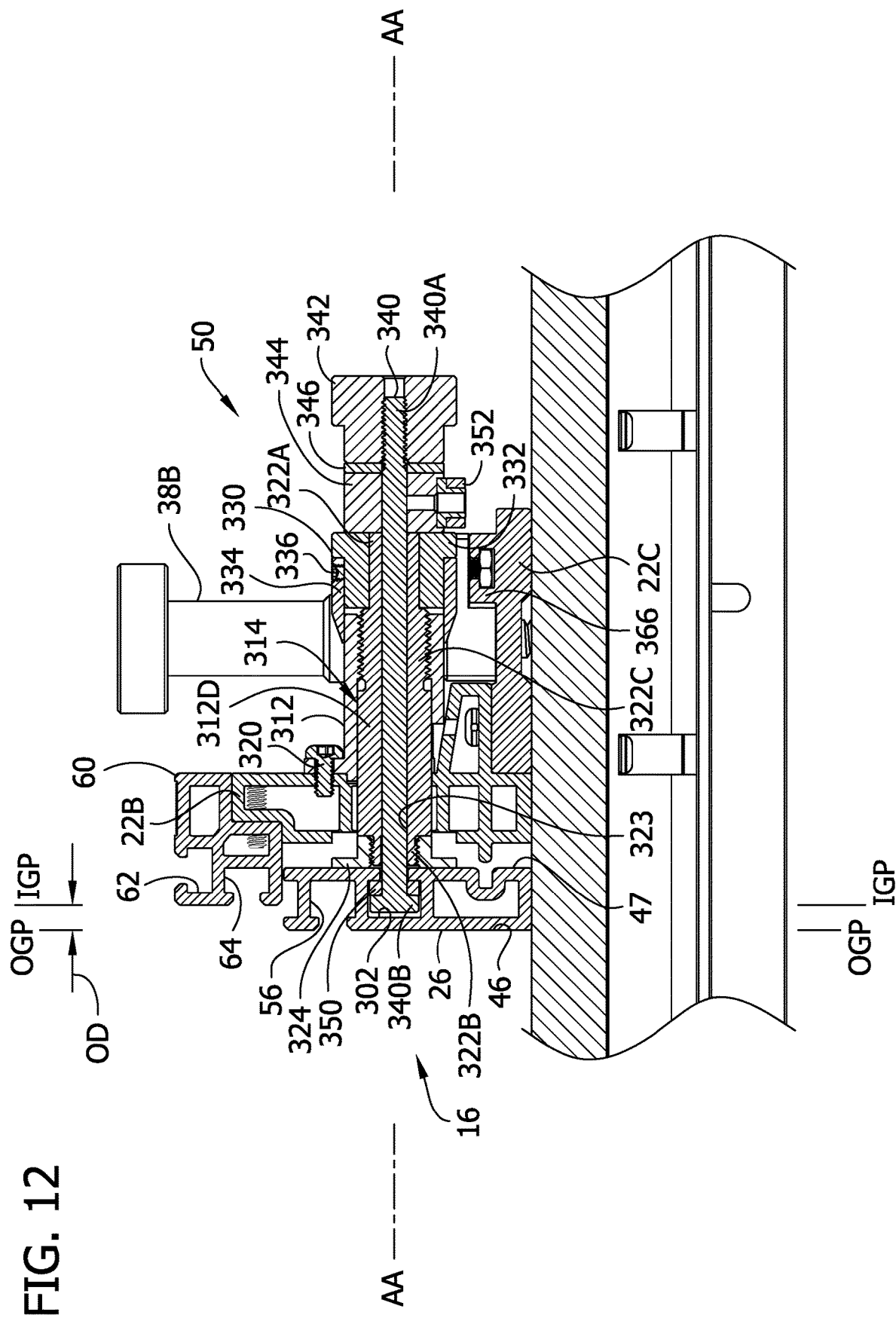
FIG. 12 is an enlarged, fragmentary section similar to FIG. 11, illustrating the screw mechanism at a second end position.

Referring to FIGS. 11 and 12, in general, the screw mechanisms 310A, 310B are configured to selectively drive movement of the mounting posts 314 along the adjustment axis AA to move the outfeed fence 26 through a range of motion having a first end position (FIG. 11) and an opposite second end position (FIG. 12). The screw mechanisms 310A, 310B are discussed in further detail below, after first describing the movement of the outfeed fence 26 through its range of motion more generally here. Adjusting the position of the outfeed fence 26 within its range of motion adjusts an offset distance OD between the infeed guide plane IGP and the outfeed guide plane OGP. As shown in FIGS. 2 and 11, at the first end position, the offset distance OD is about 0 inches; that is, the infeed guide plane IGP and the outfeed guide plane OGP are substantially coplanar. As shown in FIG. 12, in the second end position, the offset distance is about 0.25 inches. Thus, in the illustrated embodiment, the outfeed fence adjustment mechanism 50 is configured to selectively move the outfeed fence 26 relative to the infeed fence to any position within a range of motion extending from the first end position in which the fences are positioned so that their respective guide surfaces 44, 46 are substantially coplanar to the second end position in which the outfeed guide surface is offset from the infeed guide surface by an offset distance OD of about 0.25 inches. Other outfeed fence adjustment mechanisms can be configured to drive movement of an outfeed fence through other ranges of motion without departing from the scope of the invention.

The first screw mechanism 310A will now be described in detail in reference to FIG. 11. As explained above, the first screw mechanism 310A is substantially identical to the second screw mechanism 310B. Thus, it will be understood that the description of the first screw mechanism 310A also applies to the second screw mechanism 310B unless otherwise indicated. The screw mechanism 310A includes the threaded collar 312, which is fastened (in the illustrated embodiment, using screws 320) to the upright outfeed base member 22B, and the mounting post 314, which is threadably received in the mounting collar. The illustrated mounting collar 312 has a free end portion 312A that is internally threaded and a base end portion 312B that is non-threaded. As shown in FIG. 10, a fence position reference marking 318 is provided on the exterior of the mounting collar 312 at the top portion thereof. As explained below, the mounting post 314 has corresponding markings that indicate the position of the outfeed fence 26 with respect to the infeed fence 24 by reference to the reference marking 318.

Referring again to FIG. 11, the mounting post 314 comprises a multi-piece assembly configured for being operatively received in the mounting collar 312. Specifically, the mounting post 314 comprises a screw member 322 configured for operatively mating with the threaded collar 312. The screw member 322 has an adjustment end portion 322A and a fence end portion 322B. The screw member 322 defines an axial passage 323 extending through the screw member from the adjustment end portion 322A through the fence end portion 322B. The adjustment end portion 322A is configured for attachment to an adjustment dial 330 as described in further detail below. The fence end portion 322B is externally threaded for attachment to a fence engagement member 324. The fence engagement member is internally threaded for being threadably attached to the fence end portion 322B of the screw member 322 and includes a flange for engaging the mounting face 47 of the outfeed fence 26. In one or more embodiments, the fence engagement member 324 is permanently attached to the screw member 322 after it is threaded onto the fence end portion 322B (e.g., using an adhesive, a weld, etc.).

The screw member 322 of each mounting post 314 further comprises an externally threaded intermediate portion 322C adjacent the adjustment end portion 322A and a non-threaded intermediate portion 322D extending between the fence end portion 322B and the threaded intermediate portion. The threaded intermediate portion 322C of the screw member 322 threadably mates with the threaded end portion 312A of the mounting collar 312, and the non-threaded intermediate portion 322D is slidably received in the non-threaded mounting end portion 312B of the mounting collar. When the screw member 322 is rotated about its axis (which is oriented parallel to the adjustment axis AA), engagement of the threads of the intermediate portion 322C with the threads of the mounting collar end portion 321A advances or withdraws the mounting post 314 with respect to the mounting collar 312 to adjust the position of the mounting post with respect to the mounting collar.

The dial assembly 330 is mounted on the adjustment end portion 322A of the screw member 322 for manually rotating the mounting post 314. The dial assembly 330 includes a hub member 332 that is fixed to the adjustment end portion 322A for conjoint rotation with the screw member 322. In the illustrated embodiment, the hub member 332 is press fit on the adjustment end portion 322A, but it can also be attached to the screw member 322 in other ways. An indicator member 334 is received over the hub member 332 and is marked with a plurality of circumferentially spaced fine position markings 335 (FIG. 10). As described below, the position markings 335 are configured for providing a visual indication of the position of the outfeed fence 26 along the adjustment axis AA based on their circumferential alignment with the reference marking 318 on the mounting collar 312.

The indicator member 334 is selectively attachable to the hub member 332. And when the indicator member 334 is attached to the hub member 332, the indicator member, the hub member, and the screw member 322 are configured to rotate conjointly with respect to the mounting collar 312. In the illustrated embodiment, a set screw 336 is threadably mated with the indicator member 334 and configured to be selectively engaged with the hub member 332 to attach the indicator member to the hub member. When the set screw 336 is tightened, it engages the hub member 332 to fix the circumferential position of the indicator member 334 with respect to the hub member. When the set screw 336 is loosened, the indicator member 334 is free to rotate with respect to the hub member 332. Thus, user can loosen the set screw 336 to adjust the circumferential position of the indicator member 334 on the hub member 332 to calibrate the circumferential orientation of the fine position markings 335 with the reference marking 318 on the collar 312 for providing a true indication of the offset distance OD of the outfeed fence 26.

The screw mechanism 310A further comprises a bolt 340 and a lockdown knob 342 that attach the mounting post 314 to the outfeed fence 26. The bolt 340 comprises a shaft 340A and a head 340B. The head 340B is slidably received in the T-slot 302 and the shaft 340A extends through the passage 323 in the screw member 322. A free end portion of the shaft 340A protrudes from the screw member 322 through a linking washer 344 and a slip washer 346, and a threaded segment of the free end portion is threadably received in the lockdown knob 342. The linking washer 344 is located at the end of the dial assembly 330, and the slip washer 346 is located between the lockdown knob 342 and the linking washer. Referring to FIG. 13, the shaft 340A of each bolt 340 also extends through a respective hole formed in an end portion of a linking bar 350 configured for being received in the T-slot 302 of the fence 26. As shown in FIG. 13, the linking bar 350 is positioned on the shaft 340A between the bolt head 340B and the fence 26. When the lockdown knob 342 is tightened, the fence is securely captured between the linking bar 350 and the fence engagement member 324 of the mounting post 314 to limit movement of the fence with respect to the mounting post 314. In addition, the bolt 340 and the lockdown knob 342 impart an axial force on the screw member 322 that urges braking engagement between the threaded intermediate portion 322C of the screw member and the threads of the mounting collar 312 to inhibit rotation of the mounting post 314. When the lockdown knob 342 is loosened, the mounting post 314 is relatively free to rotate within the mounting collar 312 to adjust the position of the outfeed fence 26.

Referring to FIG. 13, the mounting posts 314 of the first and second screw mechanisms 310A, 310B are linked together to minimize the extent to which the axial position of one mounting post can be offset from the other. As described above, the linking bar 350 receives the shafts 340A of each bolt 340 to provide a link between the mounting posts 314 adjacent one end of each post (e.g., adjacent the heads 340B of the bolts). In addition, a washer linking bar 352, is attached to the bottom side of each linking washer 344 to provide a second link between the mounting posts 314 adjacent the opposite end of each mounting post (e.g., adjacent the free ends of the bolt shafts 340A). The washer linking bar 352 holds the linking washers 344 against rotation.

The washer linking bar 352 is also used to provide a measurement indication of the offset distance OD of the outfeed fence 26 (FIG. 10). The washer linking bar 352 is marked with a reference marking 354 used to coarsely identify the position of the outfeed fence 26 along the adjustment axis AA in reference to a coarse fence position gauge 355. A track 360 mounts the coarse fence position gauge 354 on the base 22 of the fence assembly 10 at a position calibrated for providing coarse measurement indications of the offset distance OD. The position gauge 355 is marked with a plurality of coarse fence position markings 356 that are used in combination with the fine position markings 335 of the dial assembly 330 to provide a measurement of the offset distance OD as described below. In one or more embodiments, the gauge 355 is selectively movable with respect to the base 22 for calibrating the coarse position markings 356 with the reference markings 355 of the washer linking bar 352 to accurately indicate the offset distance OD.

The mounting posts 314 are configured to rotate a plurality of revolutions through the threaded collars 312 to advance the mounting fence 26 along the adjustment axis AA through its range of motion from the first end position (FIG. 11) to the second end position (FIG. 12). In the illustrated embodiment, the full range of motion of the outfeed fence 26 is achieved with four complete revolutions of the mounting posts 314. It is understood that the screw mechanisms could be configured for other numbers of revolutions without departing from the scope of the invention. As explained below, the reference markings 354 and coarse position marking 356 provide an indication of the number of revolutions that the mounting posts 314 have been rotated from the first end position, and the reference marking 318 and the fine position markings 335 provide an indication of the circumferential position of the mounting post within its current revolution. The coarse and fine position markings 356, 335 are correlated with axial distances along the adjustment axis AA so that a user can precisely determine the offset distance OD of the outfeed fence 26 by referencing the reference markings 318, 354 with coarse position markings and fine position markings.

As the mounting posts 314 are advanced or withdrawn through the collars 312 by rotating the dial assemblies 330, the washer linking bar 352 travels with the mounting posts along the adjustment axis AA. When the outfeed fence 26 is positioned at the first end position shown in FIG. 11, the reference markings 354 of the bar 352 are aligned along the adjustment axis AA with a first coarse position marking 356 of the coarse position gauge 355, thus indicating an offset distance OD of zero inches. Each time both mounting posts 314 are rotated a complete revolution from the first end position, the reference markings 354 align with a subsequent coarse position marking 356 on the gauge 355. In the illustrated embodiment, complete revolutions of the mounting posts 314 move the outfeed fence 26 by about one-sixteenth of one inch. Thus, the coarse gauge 355 includes markings for offset distances OD of about ⁰⁄₁₆ inches (the first end position), about ¹⁄₁₆ inches (one complete revolution from the first end position), ⅛ inches (two complete revolutions from the first end position), ³⁄₁₆ inches (three complete revolutions from the first end position), and ¼ inches (four complete revolutions from the first end position, the second end position). It is understood that other coarse position gauges can have coarse position markings that indicate other offset distances without departing from the scope of the invention.

Between each complete revolution of the mounting posts 314, the fine position indicators 335 on the dial assembly 330 correlate the circumferential position of the mounting post with fine offset distances OD between the coarse position intervals indicated on the coarse position gauge 355. In the illustrated embodiment, the indicator member 334 includes 16 fine position 335 markings at equally spaced circumferential positions. Thus, rotating the mounting post 314 from a position in which one fine position marking 335 is aligned with the reference marking 318 to a position in which an adjacent fine position marking is aligned with the reference marking adjusts the offset distance OD of the outfeed fence 26 by ¹⁄₂₅₆ inches. In the illustrated embodiment, the indicator member 334 includes fine position markings for 0, ¹⁄₂₅₆, ¹⁄₁₂₈, ³⁄₂₅₆, ¹⁄₆₄, ⁵⁄₂₅₆, ³⁄₁₂₈, ⁷⁄₂₅₆, ¹⁄₃₂, ⁹⁄₂₅₆, ⁵⁄₁₂₈, ¹¹⁄₂₅₆, ³⁄₆₄, ¹³⁄₂₅₆, ⁷⁄₁₂₈, ¹⁵⁄₂₅₆ inches, each of which corresponding to the axial distance that the outfeed fence 26 has traveled from the preceding coarse position marking 356 indicated on the gauge 355. Thus, by adding the fine position indicated by the fine position markings 335 with the coarse position indicated by the coarse position markings 356, the user can determine the precise offset distance OD of the outfeed fence 26.

When routing stock to form a full-face cut, the outfeed fence assembly 16 can be used to position the outfeed guide surface 46 at a desired offset distance OD with respect to the infeed guide surface 44 (e.g., an offset distance that is equal to the width of the material that is being removed from the stock in the full-face cut). To adjust the position of the outfeed fence 26, the user first loosens the lockdown knobs 342. Then the user rotates dial assembly 330 and references the coarse and fine position markings 356, 335 to move the mounting posts 314 along the adjustment axis AA to position the outfeed fence 26 at the desired offset distance OD. To establish the desired offset distance OD, the user rotates each dial assembly 330 until the coarse reference marking 354 is aligned with the desired coarse position marking 356 and the fine reference marking 318 is aligned with the desired fine position marking 335. Rotation of the dial assembly 330 rotates the screw member 322 to threadably advance or withdraw the mounting post 314 through the mounting collar 312. When increasing the offset distance OD, the fence engagement member 324 bears against the mounting face 47 of the outfeed fence 26 to drive movement of the outfeed fence along the adjustment axis AA. When decreasing the offset distance OD, the linking bar 350 bears against the outfeed fence 26 to drive movement of the fence. When the outfeed fence is positioned at the desired offset distance OD, the user tightens the lockdown knobs 342 to secure the mounting posts 314 against further rotation with respect to the mounting collars 312. In this configuration, the two mounting posts 314 rigidly support the outfeed fence 26 and limit flexure of the fence. The properly positioned outfeed guide surface 46 can precisely guide the out-fed stock after being full-face cut to enhance the edge quality of the finished stock.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A sled assembly configured to guide movement of stock along a length of a table fence mounted on a work table, the table fence defining a race extending along the length of the table fence and having a width, the sled assembly comprising:
   a carriage configured to be supported on the table fence for movement along the length of the table fence, the carriage comprising a body having a first end portion, an opposite second end portion, and a length extending from the first end portion to the second end portion, the length of the carriage body extending generally parallel to the length of the table fence when the carriage is supported on the table fence;
   a sled fence connected to the carriage for movement with the carriage along the length of the table fence, the sled fence being configured for operatively engaging the stock to guide movement of the stock with the sled fence along the length of the table fence in a feed direction;
   a roller assembly comprising first and second rollers mounted on the carriage at spaced apart positions along the length of the carriage body for rotation with respect the carriage, the first and second rollers being configured to engage the table fence when the carriage is supported on the table fence to guide movement of the carriage along the length of the table fence and each of the first and second rollers having a peripheral portion shaped and arranged for being received in the race, the roller assembly further comprising an adjustable roller mount mounting the first roller on the carriage body, the adjustable roller mount being configured for selectively adjusting a position of the first roller with respect to the carriage generally along an adjustment axis oriented transverse to the length of the carriage to align the peripheral portions of the first and second rollers with the width of the race.

2. A sled assembly as set forth in claim 1 wherein the adjustable roller mount comprises a mounting stem movable with respect to the carriage generally along the adjustment axis and a locking member selectively engageable with the mounting stem to fix the mounting stem in position with respect to the carriage.

3. A sled assembly as set forth in claim 2 wherein the carriage body defines a stem opening extending generally along the adjustment axis and configured for receiving the mounting stem therein.

4. A sled assembly as set forth in claim 3 wherein the mounting stem comprises a screw portion threadably received in the stem opening.

5. A sled assembly as set forth in claim 4 wherein the carriage body defines a locking member opening extending along a locking axis transverse to the adjustment axis, the locking member opening intersecting the stem opening and being configured for receiving the locking element for movement along the locking axis.

6. A sled assembly as set forth in claim 5 wherein the locking member is threadably received in the locking opening.

7. A sled assembly as set forth in claim 5 wherein the locking member comprises a locking end for engaging threads of the screw portion of the mounting stem in the locking opening.

8. A sled assembly as set forth in claim 4 wherein the mounting stem further comprises an axle portion extending away from the screw portion and configured to mount the roller on the carriage for rotation about the axle portion.

9. A sled assembly as set forth in claim 1 wherein each of the first and second rollers comprises a radially outwardly facing tread surface configured to engage a top portion of the fence when the peripheral portion thereof is received in the race.

10. A sled assembly as set forth in claim 9 wherein the peripheral portion of each of the first and second rollers comprises a projection extending radially outwardly from the respective tread surface.

11. A sled assembly as set forth in claim 1 wherein the peripheral portion of each of the first and second rollers has opposite axially outwardly facing first and second sides.

12. A sled assembly as set forth in claim 11 wherein the first side of the peripheral portion of the first roller is configured for substantially parallel engagement with a first side of the race and the second side of the peripheral portion of the second roller is configured for substantially parallel engagement with a second side of the race when the peripheral portions of the first and second rollers are aligned with the width of the race.

13. A sled assembly as set forth in claim 1 further comprising third and fourth rollers mounted on the carriage at spaced apart positions along the length of the carriage body for rotation with respect the carriage, each having a peripheral portion shaped and arranged for being received in the race.

14. A sled assembly as set forth in claim 13 further comprising another adjustable roller mount mounting one of the second and third rollers on the carriage and configured for selectively adjusting a position of said one of the second and third rollers with respect to the carriage generally along the adjustment axis.

15. A sled assembly as set forth in claim 1 further comprising a miter angle adjustment mechanism for selectively adjusting a miter angle of the sled fence.

16. A sled assembly as set forth in claim 1 in combination with the table fence.

17. A combination as set forth in claim 16 wherein the fence comprises an extruded track forming the race.

18. A combination as set forth in claim 17 wherein the extruded track is made of aluminum.

19. A sled assembly as set forth in claim 1 wherein the adjustable roller mount is disposed at a fixed location on the carriage.

20. A sled assembly configured to guide movement of stock along a length of a table fence mounted on a work table, the table fence defining a race extending along the length of the table fence and having a width, the sled assembly comprising:
   a carriage configured to be supported on the table fence for movement along the length of the table fence, the carriage comprising a body having a first end portion, an opposite second end portion, and a length extending from the first end portion to the second end portion, the length of the carriage body extending generally parallel to the length of the table fence when the carriage is supported on the table fence;
   a sled fence connected to the carriage for movement with the carriage along the length of the table fence, the sled fence being configured for operatively engaging the stock to guide movement of the stock with the sled fence along the length of the table fence in a feed direction;
   a roller assembly comprising first and second rollers mounted on the carriage at spaced apart positions along the length of the carriage body for rotation with respect the carriage, the first and second rollers being configured to engage the table fence when the carriage is supported on the table fence to guide movement of the carriage along the length of the table fence and each of the first and second rollers having a peripheral portion shaped and arranged for being received in the race, the roller assembly further comprising an adjustable roller mount mounting the first roller on the carriage body, the adjustable roller mount being configured for selectively adjusting a position of the first roller with respect to the carriage generally along an adjustment axis oriented transverse to the length of the carriage to align the peripheral portions of the first and second rollers with the width of the race, wherein the adjustable roller mount comprises a mounting stem movable with respect to the carriage generally along the adjustment axis.

* * * * *